UNITED STATES PATENT OFFICE.

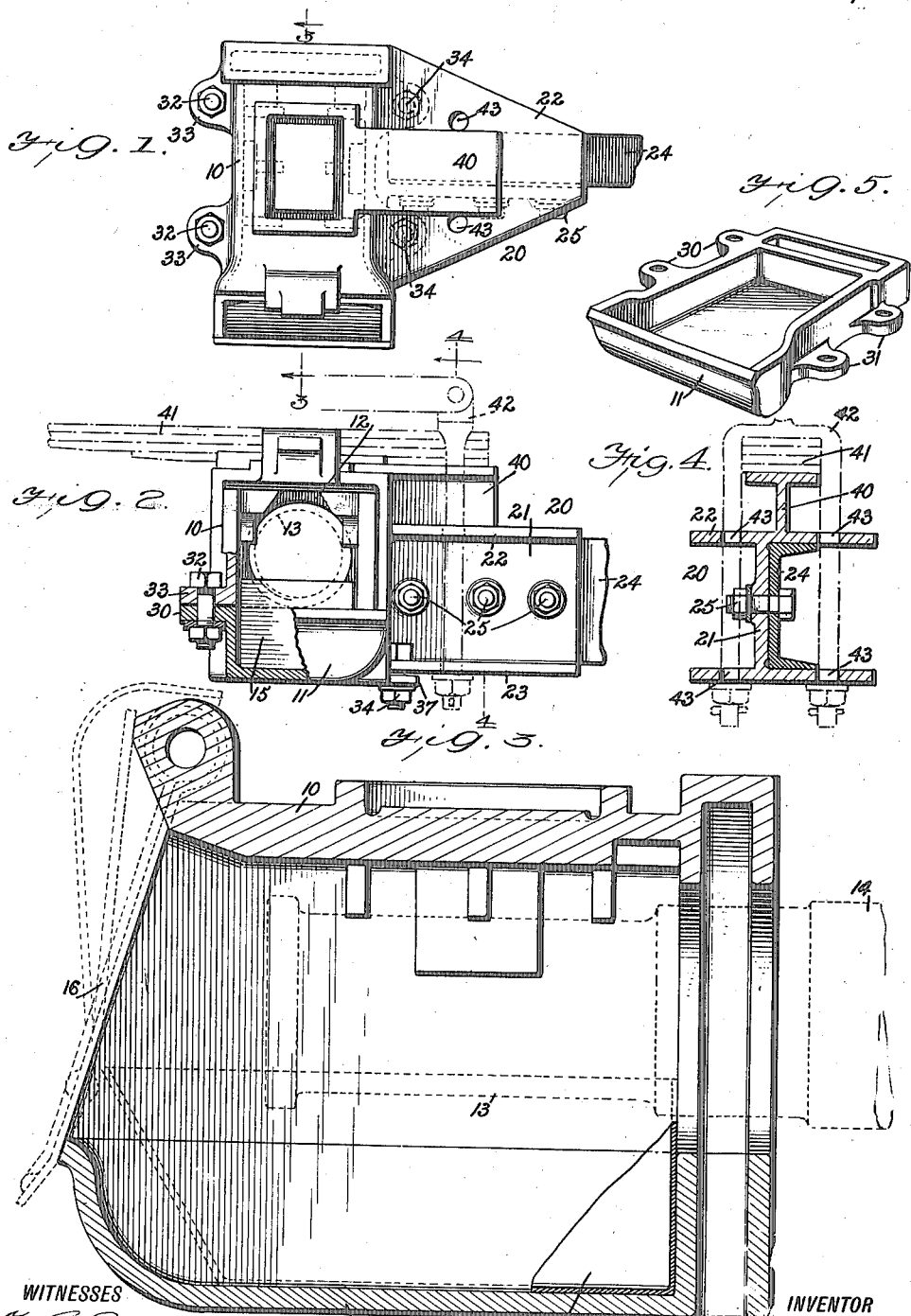

LEWIS E. KEIL, OF ST. LOUIS, MISSOURI, ASSIGNOR TO ST. LOUIS CAR COMPANY, OF ST. LOUIS, MISSOURI, A CORPORATION OF MISSOURI.

JOURNAL-BOX.

1,254,604.  Specification of Letters Patent.  Patented Jan. 22, 1918.

Application filed April 17, 1917. Serial No. 162,669.

*To all whom it may concern:*

Be it known that I, LEWIS E. KEIL, a citizen of the United States, and a resident of St. Louis, State of Missouri, have invented a new and Improved Journal-Box, of which the following is a full, clear, and exact description.

The invention relates to journal boxes for car axles, and its object is to provide a new and improved journal box arranged to permit of readily removing the axle with the wheels mounted thereon from the truck without removing or disturbing the position of the bearing member of the journal box on the truck frame.

In order to accomplish the desired result, the upper or bearing member of the journal box is rigidly attached to the truck frame and the lower member containing the lubricant is removably attached to the bearing member.

A practical embodiment of the invention is represented in the accompanying drawings forming a part of this specification, in which similar characters of reference indicate corresponding parts in all the views.

Figure 1 is a plan view of the journal box as applied to the truck frame;

Fig. 2 is a front elevation of the same with parts shown in section;

Fig. 3 is an enlarged cross section of the journal box on the line 3—3 of Fig. 1;

Fig. 4 is a cross section of the truck frame beam and the journal box bracket fastened to the said beam, the section being on the line 4—4 of Fig. 2; and Fig. 5 is a transverse view of the lower removable member of the journal box.

The journal box in its general construction consists of an upper bearing member 10 and a lower member 11, the upper bearing member 10 being provided with the usual bearing or brass 12 engaging the journal 13 of the axle 14. The lower member 11 is provided with a pan 15 adapted to contain the waste and lubricant for lubricating the journal 13. On the top of the bearing member 10 of the journal box is pivoted the usual spring-pressed cover 16 for closing the front end of the journal box. The upper bearing member 10 is provided with a sidewise extending integral bracket 20 having a web 21 and top and bottom flanges 22, 23, and the said bracket fits onto the side beam 24 of the truck frame and is secured to the said beam by bolts 25. By reference to Fig. 4 it will be noticed that the beam 24 of the truck frame is of channel shape and fits against the web 21 and the corresponding portions of the top and bottom flanges 22 and 23 of the bracket 20. Thus an exceedingly strong and rigid connection is had between the bracket 20 and the truck beam, and as the bracket 21 forms an integral part of the upper member 10 of the journal box, it is evident that the said bearing member is rigidly carried on the truck frame. The lower bearing member 15 is provided on its sides with flanges 30 and 31, of which the flanges 30 are fastened by bolts 32 to flanges 33 formed integrally on the corresponding side of the upper bearing member 10. The flanges 31 are fastened by bolts 34 to the bottom flange 23 of the bracket 20 to permit of conveniently removing the bottom member 11 from the bearing member 10 whenever it is desired to remove the axle 14 and its wheels from the truck without disturbing the position of the upper bearing member 10 on the beam 24 of the truck frame.

The upper flange 22 of the bracket 20 is provided with an integral tongue 40, preferably T shape in cross section, as plainly shown in Fig. 4. To the top of the tongue 40 are fastened the ends of a leaf spring 41 by a clip 42, as indicated in dotted lines in Figs. 2 and 4, and more fully shown and described in an application for Letters Patent of the United States for a spring support, Serial No. 162,670, filed by me April 17, 1917. The side bars of the clip 42 for the spring 41 extend through apertures 43 and 44 formed in the top and bottom flanges 22 and 23 of the bracket 20, as indicated in said Figs. 2 and 4.

It is understood that in order to remove the axle and the wheels attached thereto for repairs or other purposes it is only necessary to remove the bolts 32, 34 and the lower box members 11 of the two journal boxes for each axle and to then jack up or otherwise raise the truck frame until the journals 13 clear the bottoms of the upper bearing members 10. The wheels with their axle can then be rolled out from underneath the truck frame.

It is understood that when the lower box member 11 is removed from the bearing member 10 then a clear passage is had in the upper bearing member 10 to permit of lifting the truck frame with a view to disengage the bearing member 10 from the journal 13 of the axle 14.

It will be noticed that by arranging the supporting bracket 20 at one side of the bearing member 10, as described, the top of the journal box is left unobstructed to support the usual elliptical or other spring for yieldingly supporting the car body.

Having thus described my invention, I claim as new and desire to secure by Letters Patent:—

1. In combination, a truck having a side beam, a journal box having an upper bearing member and a lower lubricant containing member, the upper bearing member having an integral sidewise extending bracket fitting the end of the said side beam, bolts permanently fastening the said bracket to the said side beam, bolts fastening the outer side of the said lower lubricant containing member removably to the said upper bearing member, and bolts fastening the inner side of the said lower lubricant containing member to the bottom of the said bracket.

2. In combination, a truck having a side beam, a journal box having an upper bearing member and a lower lubricant containing member, the upper bearing member having at its inner side an integral sidewise extending bracket having a vertical web, top and bottom flanges and a T-shaped tongue extending integrally from the top flange for the attachment of the spring support for the car body, the said bracket fitting against one face of the web of the side beam and the corresponding flanges, fastening means fastening the bracket to the side beam, and fastening means removably fastening the said lower lubricant containing member to the under side of the said upper bearing member, sundry of the last-named bolts engaging the bottom flanges of the said bracket.

3. In combination, a truck having a side beam and a journal box having an upper bearing member and a lower lubricant containing member, the upper bearing member having an integral sidewise extending bracket having a vertical web and top and bottom flanges and the said truck beam being of channel form fitting against one face of the web and the corresponding flanges, bolts fastening the bracket to the truck beam, and bolts removably fastening the said lower box member to the under side of the upper box member, sundry of the last-named bolts engaging the bottom flanges of the said bracket.

4. In combination, a truck having a side beam and a journal box having an upper bearing member and a lower lubricant containing member, the upper bearing member having an integral sidewise extending bracket having a vertical web, top and bottom flanges, and a T-shaped tongue extending integrally from the top flange for the attachment of the spring support for the car body, the said truck frame beam being of channel form fitting against the web of the said bracket and the corresponding bracket flanges, bolts fastening the said web bracket to the truck beam, and bolts fastening the said lower box member to the underside of the upper box member, sundry of the last-named bolts engaging the bottom flanges of the said bracket.

LEWIS E. KEIL.